United States Patent [19]
Stutte et al.

[11] Patent Number: 5,992,090
[45] Date of Patent: Nov. 30, 1999

[54] PROCESS FOR PRODUCING VEGETATIVE AND TUBER GROWTH REGULATOR

[75] Inventors: Gary W. Stutte; Neil C. Yorio, both of Kennedy Space Center, Fla.

[73] Assignee: Dynamac International Inc., Rockville, Md.

[21] Appl. No.: 09/013,603

[22] Filed: Jan. 26, 1998

[51] Int. Cl.⁶ .................................................. A01G 31/00
[52] U.S. Cl. ............................................. 47/58.1; 47/62 N
[58] Field of Search .................................. 47/58.1, 62, 59

[56] References Cited

U.S. PATENT DOCUMENTS

| | | | |
|---|---|---|---|
| 4,178,716 | 12/1979 | Harper | 147/62 |
| 4,961,774 | 10/1990 | Brochier | 71/77 |

OTHER PUBLICATIONS

"Tuber Formation in Potato: Induction, Initiation, and Growth" by E.E. Ewing, Horticultural Reviews, vol. 14, pp. 146–152, 1992.

"Growth Regulator Effects of Water Soluble Materials from Crop Residue for Use in Plant Hydrophonic Culture" by Mackowiak et al, Proceedings Plant Growth Regulator Society, 1994, pp. 233–239.

"Physiology of Tuberization in Solanum tuberosum L." by Mauk et al, in Plant Plysiol. (1978) 62, pp. 438–442.

"An integrated view of the hormonal regulation of tuber formation in potato (Solanum tuberosum)" by Vreugdenhil et al in Physiologia Plantarum 75, 1989, pp. 525–531.

"Jasmonic Acid Induces Tuberization of Potato Stolons Cultured in Vitro" by Pelacho et al, in Plant Physiol., 1991, vol. 97, pp. 1253–1255.

"Utilization of Potatoes in Bioregenerative Life Support Systems" in Adv. Space Res., vol. 7, No. 4, pp. (4)115–(4)122, 1987.

"Tuberization and Hormones" by Melis et al, in Z. Pflanzenphysiol. Bd. 113, pp. 271–293, 1984.

"Comparison of Aerobically–Treated and Untreated Crop Residue as a Source of Recycled Nutrients in a Recirculating Hydrophonic System," by Mackowiak et al, in Adv. Space Res., vol. 18, No. 1/2, pp. (1/2)281–(1/2)287, 1996.

"Recycling Crop Residues for Use in Recirculating Hydrophonic Crop Production" by Mackowiak et al, in Proc. Int. Sym., Plant Production in Closed Ecosystems, pp. 19–24, 1996.

"Potato Growth and Yield Using Nutrient Film Technique (NFT)," by Wheeler et al, in American Potato Journal, vol. 67, 1990, pp. 177–187.

"Jasmonates and Their Role in Plant Growth and Development, with Special Reference to the Control of Potato Tuberization" A Review, by van den Berg et al, in American Potato Journal, vol. 68, 1991, pp. 781–794.

Primary Examiner—Michael J. Carone
Assistant Examiner—Jeffrey L. Gellner
Attorney, Agent, or Firm—Larson & Taylor

[57] ABSTRACT

A process of making a vegetative and tuber growth regulator. The vegetative and tuber growth regulator is made by growing potato plants in a recirculating hydroponic system for a sufficient time to produce the growth regulator. Also, the use of the vegetative and growth regulator on solanaceous plants, tuber forming plants and ornamental seedlings by contacting the roots or shoots of the plant with a sufficient amount of the growth regulator to regulate the growth of the plant and one more of canopy size, plant height, stem length, internode number and presence of tubers in fresh mass. Finally, a method for regulating the growth of potato plants using a recirculating hydroponic system is described.

13 Claims, 10 Drawing Sheets

PROCESS FOR PRODUCING VEGETATIVE AND TUBER GROWTH REGULATOR

STATEMENT OF GOVERNMENT RIGHTS

This invention was made with Government support under life science support contract no. NAS1-12180 awarded by the National Aeronautics and Space Administration (NASA). The Government has certain rights to the invention.

BACKGROUND OF THE INVENTION

1. Field of the Invention

The present invention relates to a process for the production of a regulator of vegetative growth and tuber development and a method of using same. More particularly, the present invention uses the growth of potato plants in a recirculating hydroponic system to produce a regulator of vegetative growth and tuber development.

2. Description of the Prior Art

Plant growth regulating substances are used commercially to regulate natural processes in plants in order to improve profitability management. These applications include, but are not limited to, accelerating the ripening of the fruit, synchronization of fruit ripening, fruit abscission and vegetative growth reduction.

Growth retardants are one of the most widely used classes of growth regulators in the horticultural industry. The primary applications include the reduction of turf height along highway, railroad and powerline right-of-ways, golf courses and sports facilities. Growth retardants are also used extensively in the greenhouse floriculture industry to develop a more compact and marketable plant and in the fruit industry to maintain small tree sizes.

In space exploration applications naturally occurring bioregulatory compounds that reduce plant size have a role in optimizing the volume utilization efficiency of a bioregenerative life support system (BLSS). By reducing the height of a plant, the number of plants per given area can be doubled or tripled, an increase that will directly improve the operational efficiency of a bioregenerative life support system in space conditions.

Plant growth regulators are also used to reduce the amount of vegetative biomass, reduce the amount of economic inputs applied to grow non-economically important components of biomass such as leaves and stems, reduce the time to maturity of the economic component of the plant and increase the uniformity of the final product. In addition to these primary benefits, a reduction in shoot growth can reduce harvest time by eliminating time requirements associated with removing excess plant material from machinery, pruning of final product and disposal of non-marketable vegetation.

Over the years, a number of different chemical compounds have been used to reduce the growth of plants. These compounds include amcymidol, amidochlore, mefluidide, maleic hydrazide, paclobutrazol, fluprimidol, femarimol and uniconazol. Of these, paclobutrazol and maleic hydrazide are the only compounds currently cleared for legal use in the United States for application as growth retardants on potatoes.

There are no commercially available compounds which are used for accelerating the induction of potato tubers. At the experimental level, the most pronounced effects on promotion of tuber formation are associated with gibberellin antagonists, such as pacloputrazol.

A compound related to jasmonic acid and tuberonic acid (12-OH-jasmonic acid) has been shown to be antagonistic to gibberellin and promote potato tuberization in tissue culture systems. Jasmonic acid and some derivatives have been isolated from a number of plant species, but are unstable in aqueous solutions. A stabilized jasmonic acid derivative (2-methyl jasmonic acid) is commercially available for the promotion of sugar accumulation in grapes.

With the exception of jasmonic acid, all of the compounds which are commercially available for the reduction of plant height and promotion of tuber formation are synthetic chemicals. Natural occurring jasmonic acid is chemically unstable, and must undergo stabilization prior to use.

Therefore, it is the object of the present invention to provide a natural organic product which is stable, and can be used to repartition the growth of plants in order to obtain a more marketable product. In particular, it is the object of the invention to provide a natural organic product which can be used for vegetative growth regulation and tuber induction.

It is a further object of the present invention to provide a process for the production of a vegetative and tuber growth regulator which requires no toxic inputs and produces marketable products other than the vegetative and tuber growth regulator.

SUMMARY OF THE INVENTION

In a first aspect, the present invention relates to a process for the production of a vegetative and tuber growth regulator using potato plants grown in a hydroponic system with a recirculating nutrient solution. In the process, a nutrient solution is continuously fed to the recirculating hydroponic system to contact the roots and stolons of potato plants with nutrient solution and to recirculate the nutrient solution through the hydroponic system. Periodically, a nutrient replenishment solution is added to the recirculating nutrient solution for the purpose of ensuring that the nutrient content is restored to a predetermined level. By recirculating the nutrient solution, the vegetative and tuber growth regulator concentrates in the nutrient solution until it reaches active levels. At that time, the vegetative and tuber growth regulator may be recovered from the hydroponic system.

The advantages of the process of the present invention are that it requires only non-toxic inputs in the form of nutrients, it produces a composition which is both a vegetative growth regulator and a tuber growth regulator and a valuable by-product, namely, potatoes. Further, until now no one has appreciated that the recirculation of nutrient solution in a potato growing hydroponic system would produce a vegetative and tuber growth regulator.

In a second aspect, the present invention relates to a method for regulating plant growth in solanaceous plants, tuber forming plants and ornamental seedlings. In the method, the roots of the plant are contacted with a sufficient amount of the vegetative and tuber growth regulator made by the process described above to regulate the growth of the plant.

The present invention also relates to a vegetative and tuber growth regulator obtained by the process of the present invention.

DETAILED DESCRIPTION OF THE PREFERRED EMBODIMENT

Figure 1:
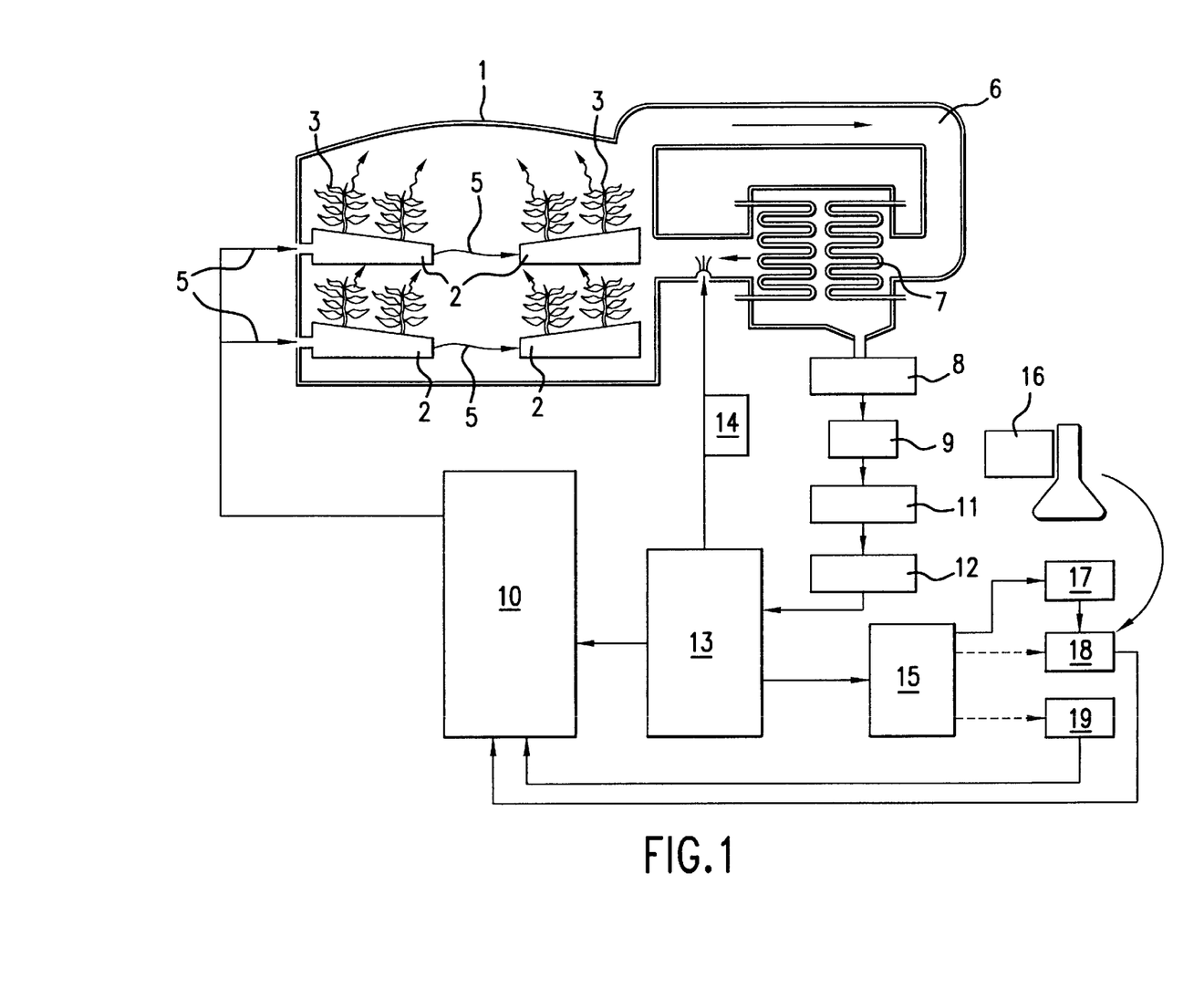
FIG. 1 is a schematic representation of a nutrient delivery system suitable for use in the process of the present invention.

Referring to FIG. 1, there is shown a schematic representation of a nutrient delivery system which can be used in the process of the present invention. The nutrient delivery system 10 is used to supply a hydroponic plant production area 1 with nutrient solution. The hydroponic plant production area 1 includes trays 2 which are used for growing potato plants 3. Each tray 2 is connected by a conduit 5 to the nutrient delivery system 10 for supply of nutrient solution from the nutrient delivery system 10 via conduits 5 to trays 2 of hydroponic system 1. A nutrient film technique (NFT) hydroponic system is preferably used, but is not essential to the invention.

The hydroponic plant production area 1 is supplied with a condensation loop 6 which is employed to maintain the atmospheric conditions of the hydroponic plant production area 1 at desired levels. Condensation loop 6 includes a condenser 7 which condenses water out of the atmosphere of the hydroponic system. The water condensed by condenser 7 is collected in condensation collector 8, filtered by filter 9 and subsequently deionized by deionizers 11 and 12, respectively. The deionized condensate is fed to condensate storage 13 where it is used as both a basis for the nutrient solution and as water for humidification of the atmosphere of the hydroponic plant production area 1. Thus, liquid from condensate storage 13 is fed both to nutrient delivery system 10 and back to condensation loop 6 via humidifier 14 to provide the desired level of humidity in the atmosphere of the hydroponic plant production area 1. Alternatively, recirculating condensate can be replaced by water of appropriate purity as a basis for the nutrient solution.

Water from condensate storage 13 may also be employed as a basis for the nutrient replenishment solution which is used to supplement the nutrient solution in the hydroponic plant production area 1. Thus, some of the water from condensate storage 13 may also be fed to nutrient replenishment 15. As feedstock for the nutrient replenishment solution, a combination of reagent grade salts 16 are mixed with water from water make-up 15 in mixer 18 to form concentrated nutrient solution which is then fed to the nutrient delivery system 10 as nutrient replenishment solution. The pH of the nutrient replenishment solution is adjusted to the desired level using stock solution 17 formed by a combination of water make-up 15 and appropriate reagent grade acid or base. Recirculation and replenishment of the nutrient delivery system of the process of the invention is an essential component of the process. Also fed to the nutrient delivery system is an acidic solution formed by a combination of water from the water make-up 15 and an acid feed which are mixed in acid mixer 19 and fed to the nutrient delivery system in order to maintain the pH of the nutrient solution at the desired acidic pH of between about 5.5 and about 6.0. In operation, this complete system can be used to carry out the process of the present invention to produce a vegetative and tuber growth regulator.

Figure 2:
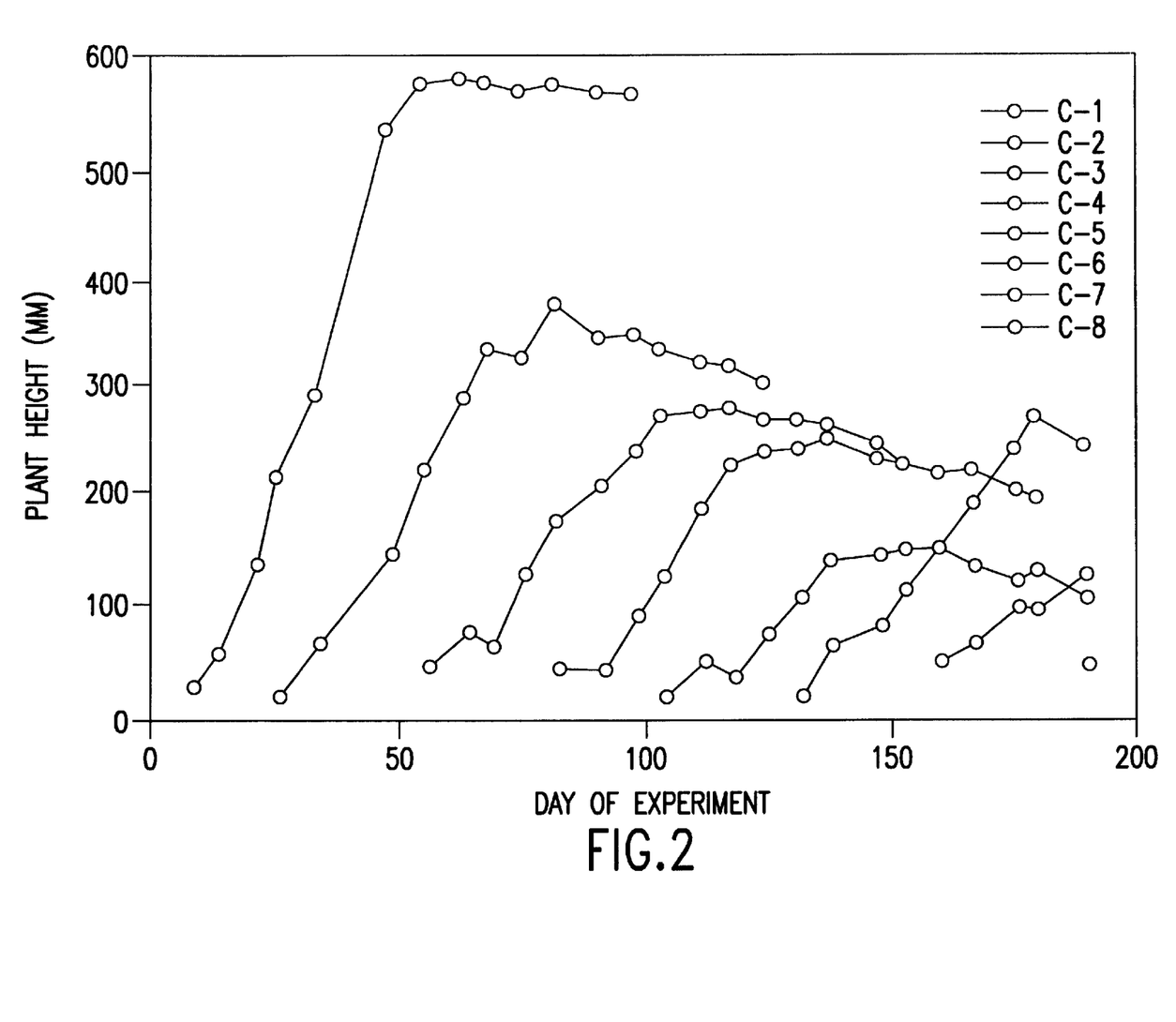
FIG. 2 shows the effect of continuous planting on height of potatoes planted into aged nutrient solution.

The vegetative and tuber growth regulator is obtained from a nutrient solution in which potatoes are actively growing. Plants which have been grown for a period of about three weeks using continuous recirculation of nutrient solution will produce bioactive concentrations of the vegetative and tuber regulator in the nutrient solution (FIG. 2). This occurs at a planting density of about four plants per twenty liters of nutrient solution. The number of plants per area (8–16 plants $m^{-2}$) is more restrictive than number of plants per unit nutrient volume. Bioactive concentrations of the vegetative and tuber growth regulator would be reached sooner at higher plant to nutrient solution planting densities.

Figure 3:
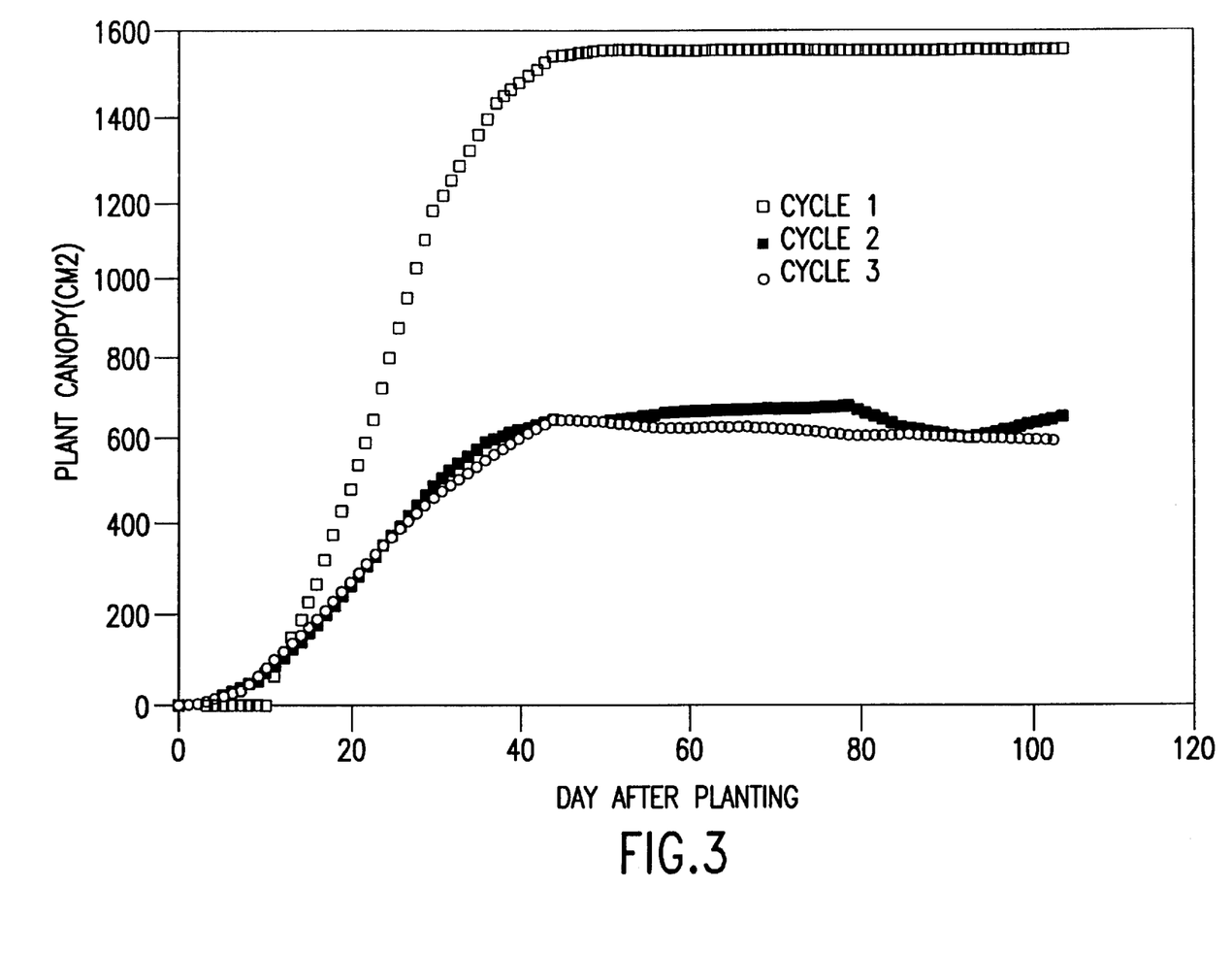
FIG. 3 shows the effect of subsequent batch plantings of potato into aged solution.

It has been found that potatoes grown on a harvest cycle of from 84 to 105 days will sustain production of the vegetative and tuber growth factor. The growth rate does not appear to be critical to the production of the growth regulator and production of the vegetative and tuber growth regulator can be sustained for more than a year in continuous production systems (FIG. 2 and FIG. 3).

Examples of start and refill nutrient solutions for use in the hydroponic system of the present invention are given below in Table 1. The solutions are modified as required to meet specific nutritional demands of the plants.

Stock solution recipes which can be mixed to provide the nutrient solution used in the hydroponic system are given below in Table 1. The solutions are modified as required to meet specific nutritional demands of the plants.

TABLE 1

BPC-NUTRIENT SOLUTIONS (start and refill)

NUTRIENT SOLUTION CONCENTRATIONS (mM)

| SALT | N | P | K | Ca | Mg | S | Fe* | Mn* | Zn* | Cu* | B* | Mo* |
| --- | --- | --- | --- | --- | --- | --- | --- | --- | --- | --- | --- | --- |
| KNO$_3$ | 2.5 | | 2.5 | | | | | | | | | |
| Ca(NO$_3$)$_2$ | 5.0 | | | 2.5 | | | | | | | | |
| MgSO$_4$ | | | | | 1.0 | 1.0 | | | | | | |
| KH$_2$PO$_4$ | | 0.5 | 0.5 | | | | | | | | | |
| Fe—EDTA | | | | | | | 60 | | | | | |

TABLE 1-continued

BPC-NUTRIENT SOLUTIONS (start and refill)

NUTRIENT SOLUTION CONCENTRATIONS (mM)

| SALT | N | P | K | Ca | Mg | S | Fe* | Mn* | Zn* | Cu* | B* | Mo* |
|---|---|---|---|---|---|---|---|---|---|---|---|---|
| $Na_2SiO_3$ micront. | | | | | | | | 7.4 | 0.96 | 1.04 | 9.5 | 0.01 |
| TOTAL | 7.5 | 0.5 | 3.0 | 2.5 | 1.0 | 1.0 | 60 | 7.4 | 0.96 | 1.04 | 9.5 | 0.01 |
| Conc in EC Refill | 62 | 12 | 48 | 9 | 10 | 10 | 134 | 74 | 9.6 | 10.4 | 95 | 0.10 |

*uM

TABLE 2

STOCK SOLN. RECIPES*
(for 40 L of each stock)

| SALT | CONC. | VOL. (ml) |
|---|---|---|
| STOCK #1 | | |
| $KNO_3$ | 1M | 2880 |
| $KH_2PO_4$ | 1M | 960 |
| $Mg(NO_3)_2$ | 1M | 320 |
| $MgSO_4$ | 1M | 480 |
| STOCK #2 | | |
| $Ca(NO_3)_2$ | 1M | 720 |
| Fe—HEDTA | 8.96 mM | 1200 |
| $H_3BO_3$ | 9.5 mM | 800 ml of micro-mix |
| $MnCl_2$ | 7.4 mM | |
| $CuSO_4$ | 1.04 mM | |
| $ZnSO_4$ | 0.96 mM | |
| molybdate | 0.01 mM | |

*The stock solutions (1 & 2) are combined in equal volumes to refill the tank.

Using the above nutrient solutions (or modified variations thereof), the potato plants are produced in a recirculating nutrient film technique hydroponic system. A reservoir 10 of 250 liters of nutrient solution is employed to support 16 trays 2, each of which has a service area of 0.25 m$^2$. The nutrient solution is preferably maintained at a constant temperature and the pH of the nutrient solution is maintained at about 5.5 to about 6.0 with additions of a strong acid such as 0.2–0.4 M $HNO_3$. The electrical conductivity of the solution is preferably maintained at about 1.2 dSm$^{-1}$ through additions of concentrated nutrient replenishment solution. The make-up solution is adjusted, based on direct nutrient analysis, to maintain the desired concentrations given in the above table 1.

The recirculation rate used for recirculating nutrient solution through the system can be from about 0.5 to about 3.0 liters per minute through each tray 2 of the hydroponic plant production area 1. A more preferred recirculation rate is about 1 liter per minute per tray. The recirculation rate is not critical to the functioning of the system but it has been observed that better results in plant growth can be obtained if the recirculation rate is controlled.

Useful concentrations of the vegetative and tuber growth regulator are readily obtained from the nutrient solution after about six weeks of supporting potato growth. The growth regulator has been detected in the solution for periods of up to 60 weeks and there is no reason to expect that it will not be produced over even longer periods. Once production has been established, the growth regulator appears to be stable in solution (FIG. 2 and FIG. 3). The vegetative and tuber growth regulator of the present invention is effective on solanaceous plant species, tuber forming species and ornamental seedlings. Thus, for example, the growth regulator can be used for solanaceous species such as tomato, eggplant, tobacco and potato. In addition, the growth regulator is expected to be active in tuber forming species including taro, jamica and Jerusalem artichoke. The foregoing list is not intended to be all inclusive and it is expected that the growth regulator of the present invention will work on other plant species as well (Table 3).

TABLE 3

Effect of tuber inducing factor on root growth of a number of vegetable species.

| Reduction | | No Change | | Promotion | |
|---|---|---|---|---|---|
| Bean | Phaseouls vulgaris L. | Eggplant | Solanum melongena | Soybean | Glycine max (L.) Merr |
| Rice | Oryza sativa L. | Pepper | Caspian annuum L. | Onion | Allium cepa |
| Pea | Pisum sativa L. | | | Tomato | Lycopersicon esculentum |
| Wheat | Tritum aestivum L. | | | Carrot | Daucus carota |
| | | | | Cauliflower | Brassica oleracea |
| | | | | Turnip | Brassica campestris |
| | | | | Corn | Zea mays |
| | | | | Radish | Raphanus sativus |

Measurements obtained after 10 days germination in the dark. Reduction indicates that root length was at least 10% shorter than control treatments and promotion indicates that root length was at least 10% greater than control treatments. All seeds exposed treated with 10 ml of aged Hoagland solution on Whatman #1 filter paper, sealed with Parafilm, and kept in dark for 10 days at 22 C. under ambient $CO_2$ conditions.

Under controlled conditions, 75 ml of 0.5× Hoagland's solution containing the vegetative and tuber growth regulator and obtained from the process of the invention after at least six weeks of potato growth, is sufficient to induce a tuber formation response in tuber forming species grown under static hydroponic conditions. The amount required for external application to plants growing in soil must be slightly higher. It has been found that growth regulator extracted from 100 ml of recirculated nutrient solution was sufficient to induce a response in a soil grown potato plant. It is expected that the threshold level of material required to produce a response will depend upon the amount of aging of the recirculating nutrient solution and the ratio of the amount of root material to the growth regulator containing nutrient solution.

Figure 4:
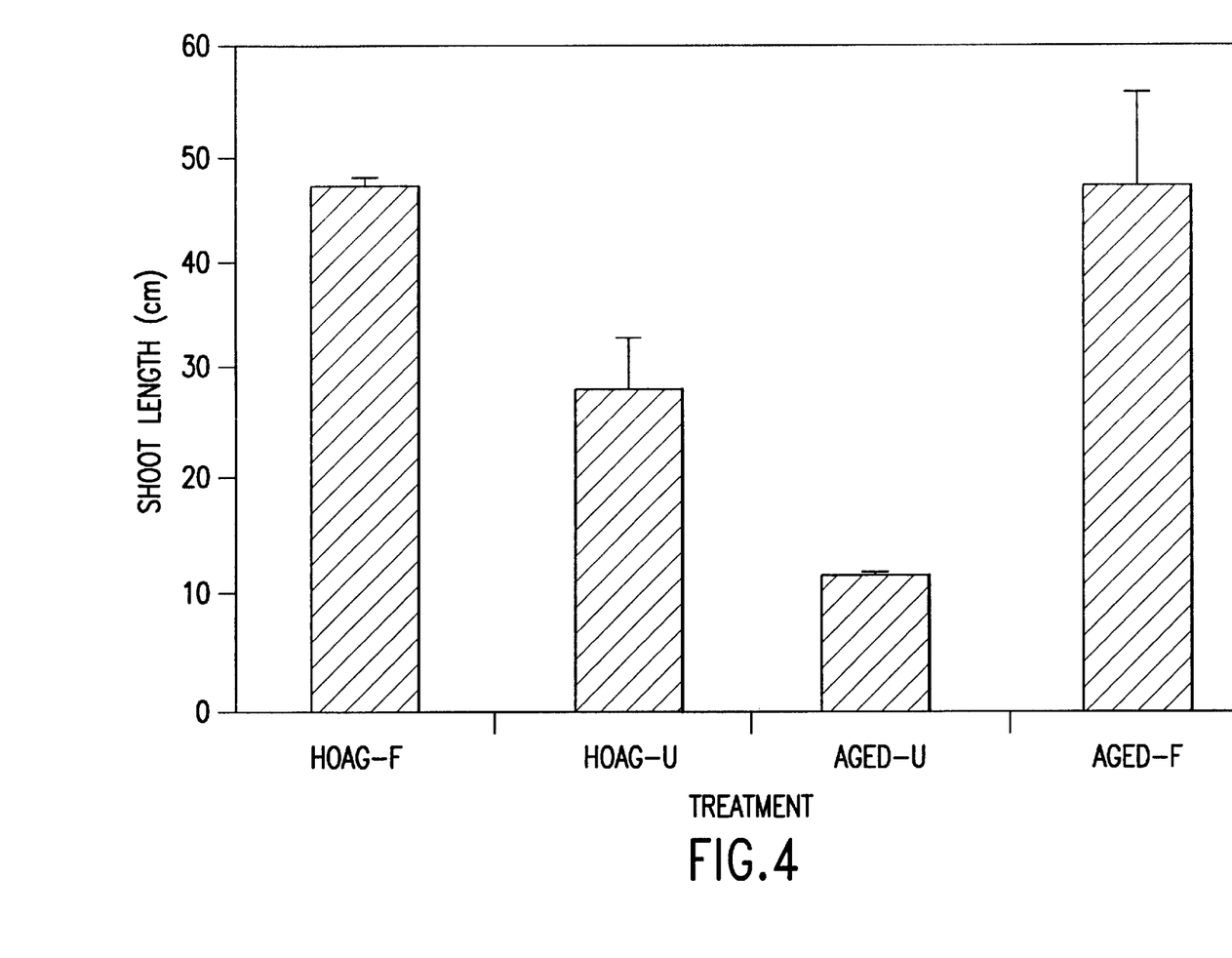
FIG. 4 shows the effects of inductive growth conditions on shoot length.

Strong bioregulatory responses on plant growth using nutrient solutions prepared by the process of the present invention have been observed when the solutions are used continuously in batch or continuous production to support potato plants (FIG. 2 and FIG. 3). The morphology and development of the potato plants was altered when plants were grown on "aged" nutrient solution (Table 2). Both the number (FIG. 5) and length of internodes (FIG. 4) were reduced and the plants took on a "bush-like" appearance. The mainstem was reduced an order of magnitude and length, the canopy volume was also reduced (FIG. 4, FIG. 2, FIG. 3) and tuber initiation occurred very early in development.

The following examples are provided to illustrate the present invention.

EXAMPLE 1

Example of the preparation of the growth regulating nutrient solution.

The vegetative and tuber inducing factor has been produced under the following conditions. Details of the production system, environmental conditions, and flow rates are given below.

The environmental conditions used were maintained for over 1-year, and the tuber inducing factor was produced under the following conditions.

Summary Table of Environmental Setpoints

| Parameter | Setpoints |
| --- | --- |
| Air temperature | 20° C. light/16° C. dark |
| Relative humidity | 65–70% |
| Photoperiod: | 12 hours light/12 hours dark |
| Light Intensity: | 800 $\mu$mol m$^{-2}$ s$^{-1}$ PAR |
| Nutrient temp. | 18° C. |
| Nutrient flow | 1–2 liter min$^{-1}$ |
| Electrical Conductivity | 1200 $\mu$S cm$^{-1}$ |
| pH | 5.8 |
| $CO_2$ concentration | 1200 $\mu$mol mol$^{-1}$ |

Materials and Methods

Plant Material

All plants were started from micropropagated, nodal explants (cv. Norland) maintained on a modified MS mineral medium with 0.7% agar, 2% sucrose, and no growth regulators. Explants (plantlets) were grown in test tubes under fluorescent lighting at approximately 100 $\mu$mol m$^{-2}$ s$^{-1}$ photosynthetic photon flux (PPF), a 16-h photoperiod and 22 C. Plantlets were maintained approximately 4–6 weeks in the culture environment prior to transplanting.

For transplanting, the agar medium was rinsed from the roots and individual plantlets are placed in holes of white-on-black polyethylene plastic sheets covering 10 cm-deep culture trays in the chamber. Three plantlets were planted in each tray, with each plantlet being wrapped by a polyurethane foam plug (3.5 cm dia., 2.2 cm long). All trays were covered with translucent white acrylic "germination" covers for 4 days to maintain high humidity during plantlet establishment. After 10 days, plants were thinned to two plants per tray for the remaining growout. The planting density was increased to 6 plants per tray during sequential harvesting and for the replanting of the batch treatment. This provides an option to react to the possibility that plant size may be reduced with time.

All plants were grown using recirculating nutrient film culture. A modified 0.5 strength Hoagland solution prepared with reagent-grade chemicals was the nutrient source for plants grown on levels 2 and 3. Potato bioreactor effluent from an Aerobic Bioreactor was the nutrient source for plants grown on levels 1 and 4. The effluent is adjusted to have a complete nutrient concentrations closely approximating the Hoagland control treatment.

The pH was controlled to near 5.8 by additions of dilute (2.5%) $HNO_3$ and nutrient solution temperature was maintained at 18° C. in all levels for the duration of the growout. Solution electrical conductivity was controlled to remain near 1.2 dS m$^{-1}$ by additions of a complete nutrient replenishment solution derived from either reagent-grade chemicals or bioreactor effluent and amendments. In addition to real time monitoring, the stock solution and acid use were manually monitored on a daily basis. Samples of the stock solutions were analyzed using ICP analysis for elemental concentrations and the nutrient solutions were sampled at weekly intervals.

A 12-hr light cycle was maintained with High Pressure Sodium (HPS) lamps for the duration of the experiment. The atmosphere was enriched and controlled to 1200 $\mu$mol$^{-1}$ $CO_2$. No effort was made to suppress $CO_2$ levels during dark cycles. Oxygen scrubbers were used to maintain 21.5% $O_2$. Relative humidity (RH) was maintained at 85% during the first 10 days of the study, then controlled to 60–90%. Air temperature was maintained at 20 C during the light cycle and 16 C during the dark cycle for the duration of the experiment.

The batch production treatment was located in the upper chamber of the Biomass Production Chamber (BPC). This treatment involved the harvest of levels 1 and 2 at 104 days after planting. The chamber was then replanted using the same nutrient solution on the same day with 4 plants tray$^{-1}$. A decision on the final planting density was made at time of thinning.

The continuous production treatment was located in the lower chamber of the BPC. This treatment involved the harvest of 4 trays (25%) of levels 3 and 4 at 26 day intervals. The trays are replanted at a density of 4 plants tray$^{-1}$. The final density (2, 3 or 4) plants tray$^{-1}$ was determined at time of thinning. The stem length, node number, leaf area, and dry mass of the plants harvested at each date were determined.

Tuber inducing activity has been obtained under different setpoints from those above as well. Differences in setpoints which also resulted in production of tuber inducing factor are detailed below.

| Parameter | Setpoints |
| --- | --- |
| Photoperiod: | 20 hours/4 hours |
| | 12 hours/12 hours |
| Photosynthesis | 12 hours/6 hours + 5.75 |
| Photon Flux (PPF) | hours (15 minute light) |

-continued

| Parameter | Setpoints |
|---|---|
| PPF (Light Intensity) | 450 $\mu$mol m$^{-2}$ s$^{-1}$ |
|  | 350 $\mu$mol m$^{-2}$ s$^{-1}$ |
| Air temperature | 24° C. constant; |
|  | 24° C. light/20° dark |
|  | 22° C. constant |
| Nutrient temperature | 18° C. constant, |
|  | 22° C. constant |
|  | 24–25° C. |
| Light source | Fluorescent Lamps |
|  | High Pressure |
|  | Sodium Lamps |

EXAMPLE 2

The effect of "aged" nutrient solution and activated carbon filtering on tuber initiation under inductive and non-inductive photoperiods is shown by this example.

This experiment was designed to show that activated carbon filtering would remove the tuber-inducing compounds from "aged" nutrient solution. "Aged" nutrient solution is nutrient solution which has been recirculated through the potato growth hydroponic system for at least six weeks of growth time. A secondary objective was to determine whether the tuber-inducing compound would over-ride a non-inductive photoperiod environment.

Figure 5:
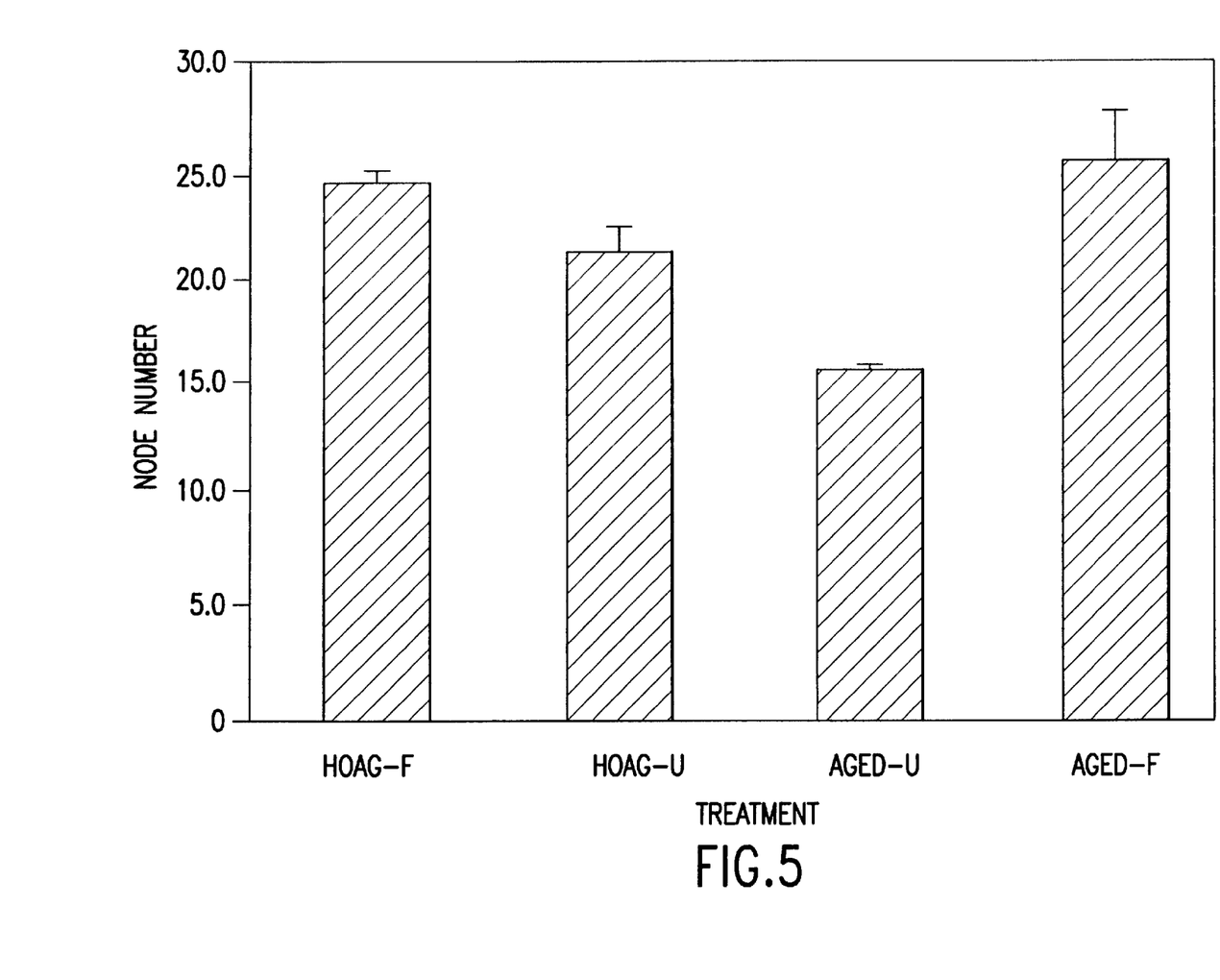
FIG. 5 shows the effects of inductive growth conditions on node number.

An ongoing experiment to determine the effect of continuous production on development of potato was the source of the "aged" nutrient solution treatment. Potatoes growing in the solution were exhibiting the apparent growth regulatory responses previously described (FIG. 5). Reagent grade 0.5 strength Hoagland's solution was used as the control treatment. An additional pair of treatments was imposed by filtering each nutrient solution through activated carbon in order to scrub organic compounds from the solution. A trickle bed, activated carbon filtering system (250 gm of aquarium grade activated carbon) was designed specifically for this experiment. Each treatment consisted of two trays containing two plants each.

The "aged" nutrient solution was replaced twice a week in order to maintain maximum concentrations of the vegetative and tuber regulating compound(s) in the root zone of the existing plants. The activated carbon filters were not replaced, and thus filtered approximately 200 L of "aged" solution over the duration of the experiment.

Each replicate of four treatments was grown under inductive (12 hours light/12 hours dark) or non-inductive (12 hours light/6 hours dark+6 hours light) photo-period for 42 days and the experiments were repeated twice. The plants were harvested at 42 days after planting in order to minimize differences associated with PPF interception by the canopy. Data on canopy size, plant height, and the presence of tubers was collected throughout the experiments. At harvest, stem length, internode number, and fresh mass were determined. Dry mass was determined after tissues were oven-dried at 70 C.

RESULTS OF EXAMPLES 1 AND 2

Growing potatoes in recirculating NFT hydroponic system resulted in the production of a naturally occurring factor which reduces the growth of potato plants. The factor was active when plants were grown in solutions in which potatoes were also growing (FIG. 2).

A reduction in plant height is observed on plants which were planted into a solution "aged" for 26 days after planting. Plant height was over 50% shorter on potatoes planted into a solution which had "aged" for 52 days (FIG. 2).

The factor is also stable, and retains activity when old plants have been removed. Evidence for this is presented in FIG. 3, where Cycle 1 plants were in "fresh" nutrient solution, and Cycle 2 was planted into nutrient solution after a 104 day harvest of the potatoes. The bioactive tuber inducing factor (TIF) remained in the solution and apparently was stable through Cycle 3, which was planted 104 days after Cycle 2.

The bioactive TIF is stable in aqueous solution and produces a reduction in plant height, node number, total plant biomass. The size of tubers is increased and percentage of total economically valuable biomass per plant is significantly increased (Table 4).

The bioactive TIF induces tuber formation under environmental conditions which are not conducive to tuber formation, indicating that it can over-ride environmental stresses which inhibit tuber formation (Table 4).

The bioactive TIF can be removed from the solution by filtering through activated carbon. The unfiltered aged solution produces a reduction in plant height and node number, accelerates tuber initiation, and increases total percentage of economically valuable potatoes per plant. Filtering the solution through activated carbon results in an increase in total shoot length, delays tuber initiation and significantly reduces total yield and economic biomass index (Table 4). These results are even more pronounced under environmental conditions not conducive to tuber initiation (Table 4), suggesting that the factor is regulating tuber initiation activity.

TABLE 4

Effect nutrient solution on the growth of potato cv. Norland grown under inductive (12/12) and non-inductive (12/6 + 6) photoperiods for 35 days with under split-root/stolon conditions with the roots in either aged or fresh nutrient solution.[z]

| Treat | Height (cm) | nodes (#) | Total (g dm) | Tubers <2.5 (#) | Tubers <2.5 (g dm) | Tubers >2.5 (#) | Tubers >2.5 (g dm) | EBI (%) |
|---|---|---|---|---|---|---|---|---|
| | | | | Inductive | | | | |
| Aged | 14.1 | 17.5 | 28.1 | 19.9 | 3.2 | 3.4 | 8.3 | 44.2 |
| Fresh | 29.5 | 20.3 | 42.4 | 26.8 | 5.9 | 3.5 | 6.3 | 27.4 |
| signif.[y] | *** | *** | *** | *** | *** | ns | ** | *** |

TABLE 4-continued

Effect nutrient solution on the growth of potato cv. Norland grown under inductive (12/12) and non-inductive (12/6 + 6) photoperiods for 35 days with under split-root/stolon conditions with the roots in either aged or fresh nutrient solution.[z]

| Treat | Height (cm) | nodes (#) | Total (g dm) | Tubers <2.5 (#) | Tubers <2.5 (g dm) | Tubers >2.5 (#) | Tubers >2.5 (g dm) | EBI (%) |
|---|---|---|---|---|---|---|---|---|
| | | | | Non-Inductive | | | | |
| Aged | 37.1 | 18.9 | 27.5 | 19.1 | 0.68 | 0.5 | 0.45 | 3.6 |
| Fresh | 40.2 | 19.1 | 30.2 | 0.9 | 0 | 0 | 0 | 0 |
| signif | ns | ns | ns | *** | *** | *** | *** | *** |

[z]All treatments with roots in either fresh or aged solution were combined, since there was no interaction with the exposure of the stolon to either fresh or aged solution.
[y]ns, , * = non-significant or significant at P = 0.01 or 0.001, respectively using Students t-test.

Filtering fresh Hoagland's solution through activated carbon resulted in similar, but less pronounced effects on potato plant morphology than the "aged" solution. This suggests that the TIF was being produced in the solution very early in development and that the effects were being observed within 42 days of adding plants to the solution (Table 5).

TABLE 5

Effect of activated charcoal filtering of either fresh or aged 0.5 strength Hoaglands solution on the growth of potato cv. Norland grown under inductive (12/12) and non-inductive (12/6 + 6) photoperiods.

| Treat[z] | Height (cm) | nodes (#) | Total (g dm) | Tubers <2.5 (#) | Tubers <2.5 (g dm) | Tubers >2.5 (#) | Tubers >2.5 (g dm) | EBI (%) |
|---|---|---|---|---|---|---|---|---|
| | | | | Inductive | | | | |
| UH | 34.3 b[y] | 22.1 a | 169.0 a | 52.8 b | 15.6 a | 17.5 a | 53.1 a | 40.5 b |
| FH | 48.8 a | 24.6 a | 156.1 a | 128 a | 11.3 ab | 3.5 c | 5.6 c | 11.0 c |
| UA | 10.6 c | 16.6 b | 94.2 b | 35.8 b | 7.36 b | 12.8 b | 42.8 ab | 55.1 a |
| FA | 47.9 a | 24.6 a | 170.3 a | 48.3 b | 12.9 ab | 20 a | 32.87 b | 26.7 bc |
| | | | | Non-Inductive | | | | |
| UH | 60.0 a | 27.4 a | 165.5 a | 70.3 a | 2.1 b | 0.5 b | 0.7 b | 1.62 b |
| FH | 46.6 b | 25.1 a | 113.4 b | 24.3 b | 0.4 b | 0 b | 0 b | 0.35 c |
| UA | 42.7 b | 23.4 a | 138.2 ab | 55.1 ab | 9.2 a | 10.8 a | 26.6 a | 24.4 a |
| FA | 54.3 ab | 25.9 a | 152.8 a | 69.5 a | 1.4 b | 0 b | 0 b | 0.89 bc |

[z]Treatments are unfiltered Hoagland control (UH), filtered Hoagland control (FH), Unfiltered aged solution (UA) and filtered aged solution (FA).
[y]Mean separation within columns and photoperiod treatment by Duncan's Multiple range test at P = 0.05.

Figure 6:
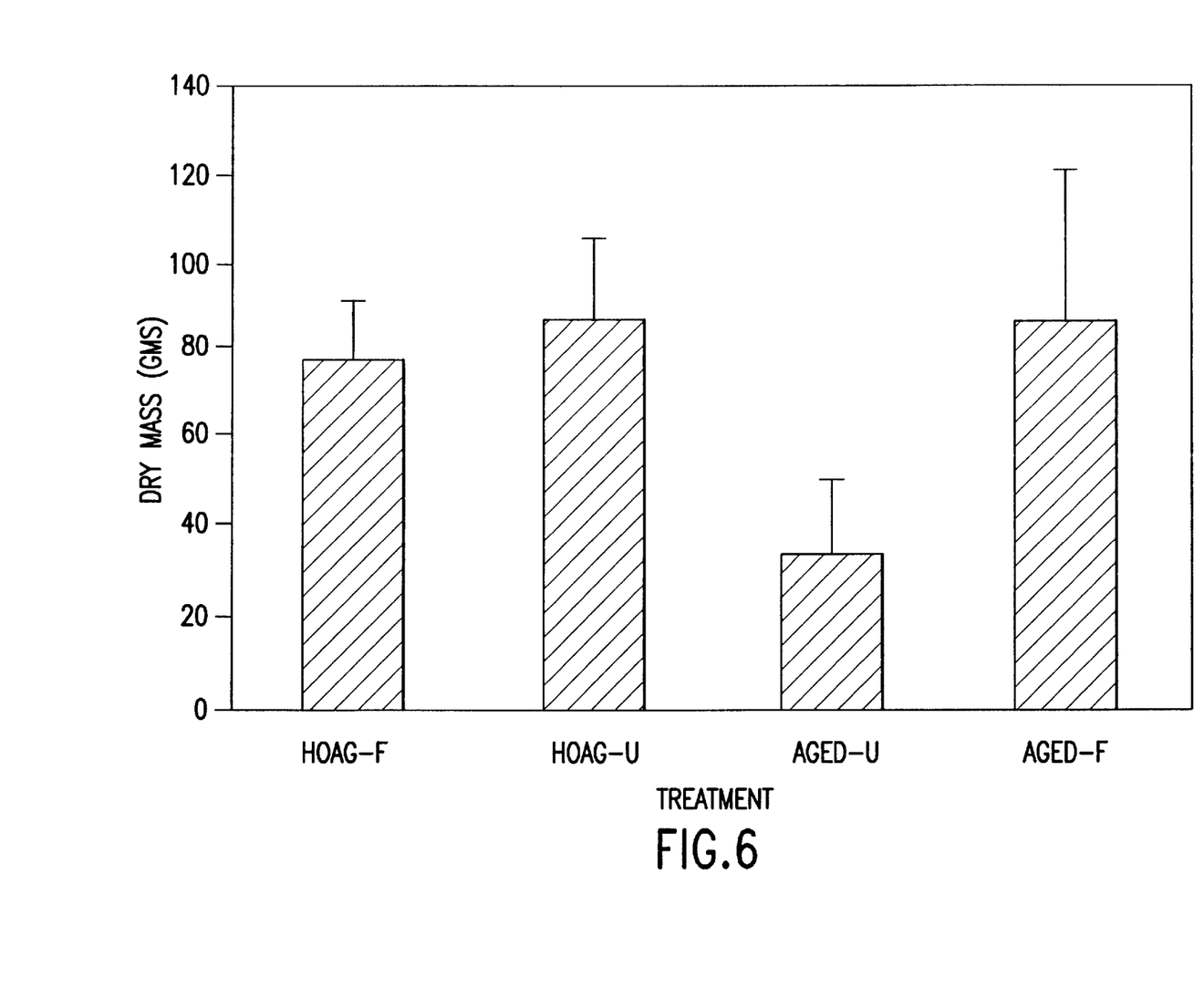
FIG. 6 shows the effects of inductive growth conditions on total plant biomass.
Figure 7:
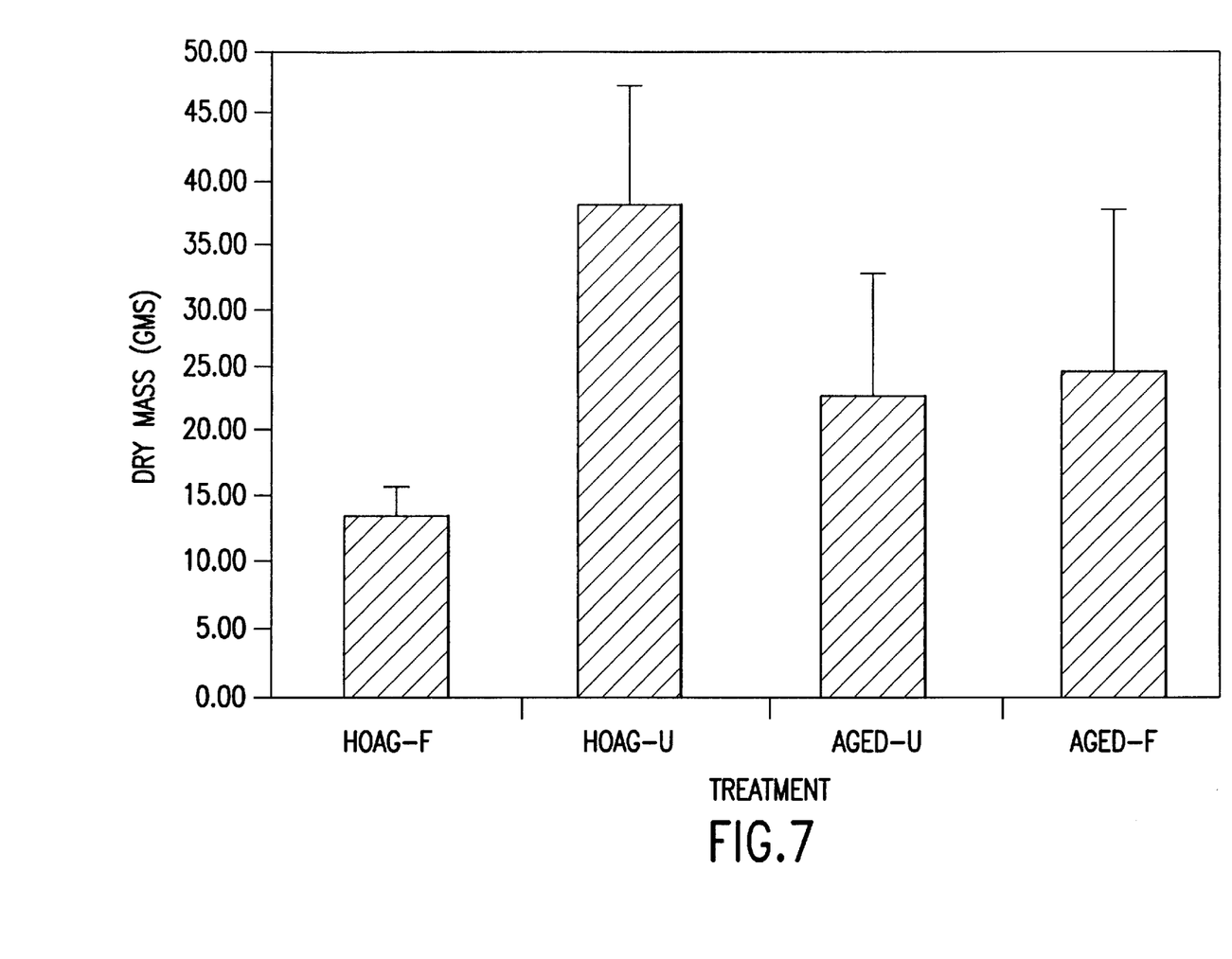
FIG. 7 shows the effects of inductive growth conditions on total edible biomass.
Figure 8:
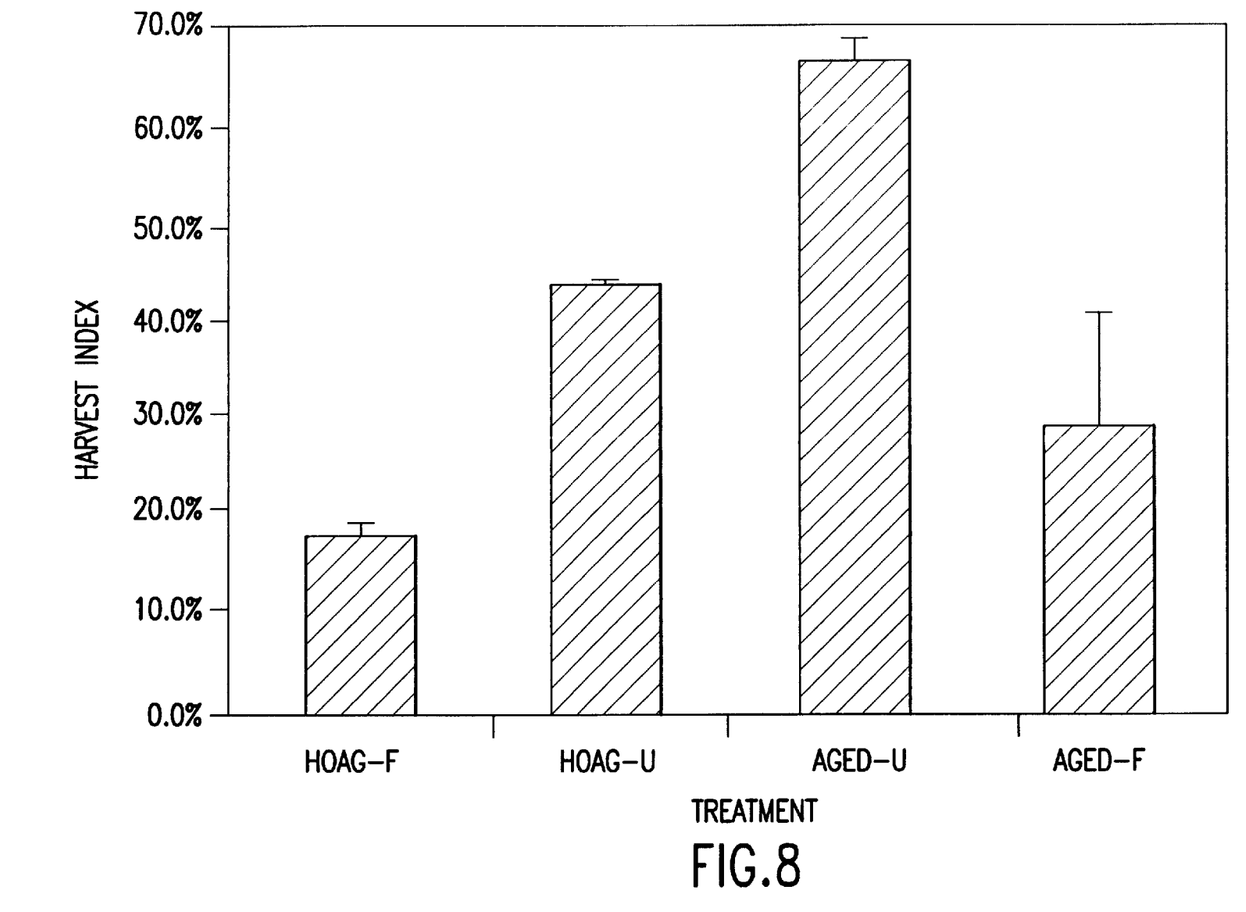
FIG. 8 shows the effects of inductive growth conditions on the harvest index.

The primary effects of the bioactive TIF are:
1. Reducing the length of the main shoot (FIG. 4).
2. Reducing the number of nodes on the main stem (FIG. 5).
3. Reducing total size (biomass) of the plant (FIG. 6).
4. A reduction in total edible yield per plant resulting from small overall plants (FIG. 7).
5. An increase in percentage of total edible biomass per plant (FIG. 8).

EXAMPLE 3

Localization of the site of activity of the tuber-inducing factor in the nutrient solution.

This experiment was designed to show that root uptake is required for the bioregulatory activity to be expressed. In order to show this, an experiment which separates the roots and stolons was conducted. Plantlets were transplanted in a gutter-design NFT system containing fresh 0.5× Hoagland's solution. After 14 days, the root system was placed in fresh Hoagland's solution and the stolons in "aged" solution obtained from an ongoing BPC experiment as previously described. Reciprocal treatments, roots in "fresh" and stolons in "aged" solution, were also performed. Controls consisted of plants with both roots and stolons in either "fresh" or "aged" solution. The gutter design allowed splitting of the root/stolon without damage to the plant. An absorbent nylon material (Nytex™) was used to wick the appropriate nutrient solution to the stolons immediately following transplanting.

The plants were harvested after 35 days in order to minimize yield effects associated with crowding in the chamber. Each experiment was repeated two times. At harvest, stem length, internode number, and fresh mass were determined. Dry mass was determined after tissues were oven-dried at 70 C.

The number of nodes was lower on plants with roots in "aged" solution grown under inductive photoperiods. Under non-inductive photoperiods, the number of nodes appeared independent of whether the roots were in "fresh" or "aged" nutrient solution. The reduction in the number of nodes was reflected in reduced height of plants with roots in "aged" solution under inductive (12 hours light/12 hours dark)

photoperiods. When the plants were grown under non-inductive photoperiods (12 hours light/5.75 hours dark+0.25 hours light and 6 hours dark; 12/6+6), vegetative growth was promoted and plants were significantly taller than when exposed to inductive conditions. Under an inductive photoperiod, all treatments induced tubers, but treatments with roots in "aged" solution initiated tubers about 5 days earlier than those with roots in fresh solution. Under non-inductive conditions, plants with roots in the "aged" solution initiated tubers, irrespective of whether the stolons were in "aged" or fresh solution (FIG. 2). Exposure of stolons alone to "aged" solution was insufficient to initiate tubers.

These experiments indicate that a biologically active compound(s) that stimulate the initiation of tubers is produced when potatoes are grown in recirculating hydroponic solutions. These experiments further suggest that such compounds are stable in aqueous nutrient solutions. These compounds are not readily oxidizable, since the nutrient solutions are well aerated, and simple organic compounds would be expected to rapidly degrade via biotic and abiotic mechanisms. Periodic analysis of the nutrient solution indicated that simple organics, e.g. organic acids, phenolic compounds, were not present at detectable levels. Further, the total organic carbon load in the nutrient solutions was comparable between the fresh and aged solutions ($\approx 50$ $\mu$g $L^{-1}$). These results suggest that the growth regulator is an organic compound since it can be removed from the nutrient solution with activated carbon.

Filtering the solution through activated carbon resulted in tuber-initiation occurring at a time similar to the Hoagland control treatment. Under inductive photoperiods, not only was tuber-initiation delayed in "aged" solution, but the plant morphology (node number, canopy area, etc.) were the same as the control treatments. Under non-inductive photoperiods, all plants were more vegetative, as would be expected, and only the "aged" solution treatments initiated a significant number of tubers. Also, the carbon filtered "aged" solution treatment initiated slightly more tubers than the Hoagland controls. This result may be due to changing the solution twice per week which allowed these treatments to be exposed to the tuber-inducing compounds for a short period of time before being scrubbed from the solution. The apparent responsiveness of the plants to this treatment suggests that a low response threshold may exist.

The results of experiments grown with roots and stolons in separate solutions confirm the biological activity of the solution on potato plants. These experiments also indicate that the tuber-inducing factors do not act through contact on the stolon, per se, since continuous exposure of the stolon to "aged" solution did not result in earlier tuber formation in either inductive or non-inductive photoperiods. However, exposure of the roots to "aged" solution resulted in expression of the growth response irrespective of whether the stolons were in fresh or aged solution. This suggests that uptake and transport of the tuber-inducing factor through the xylem is required before biological activity is expressed. It further suggests that the growth regulator triggers a tuber-inducing response that is transported to the stolons. Indirect evidence for this hypothesis was also observed. Stolons produce adventious roots from nodes when grown in solution culture which have vascular connections to the developing tuber or leaf at that node. Although these roots were exposed to the same treatment as the stolon, a biological response was a factor of the treatment experienced by the primary root system.

These experiments document and describe the biological activity of compound(s) which stimulate tuber formation which is produced when plants are grown in hydroponic solution. The tuber-inducing factor is an organic compound which is relatively stable in aqueous solution and is capable of over-riding a non-inductive photoperiod.

EXAMPLE 4
The Effects of Tuber Inducing Factor on Other Species

Figure 9A:
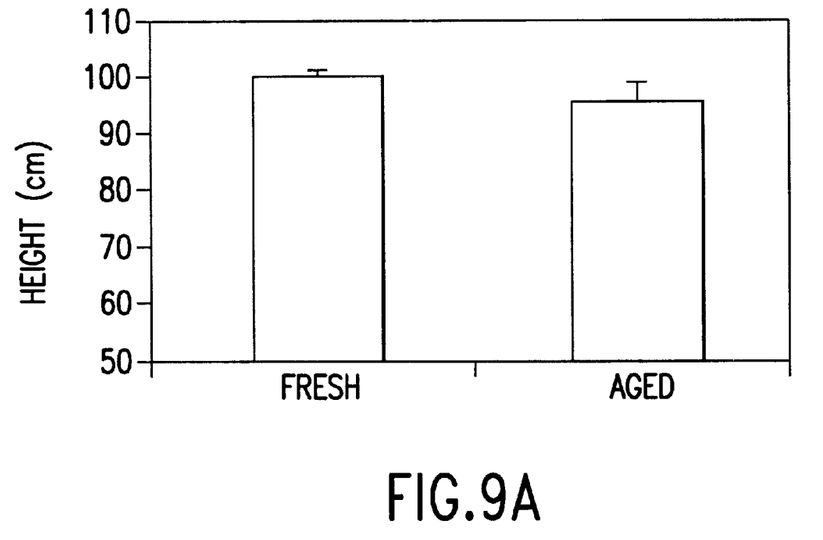
FIG. 9a shows the effect of the growth regulator of the present invention on the shoot length of sweetpotato.
Figure 9B:
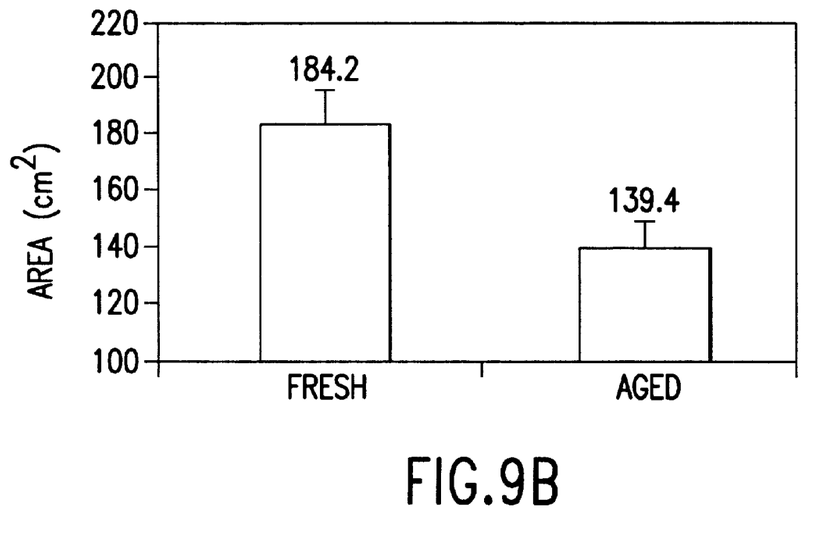
FIG. 9b shows the effect of the growth regulator of the present invention on the canopy area of soybean plants.

The biological factors present in the solution also have an effect on other species. Limited long-term studies have shown that overall canopy area of both sweetpotato (FIG. 9a) and soybean plants (FIG. 9b) is reduced when grown on solution containing the tuber inducing factor.

Figure 10:
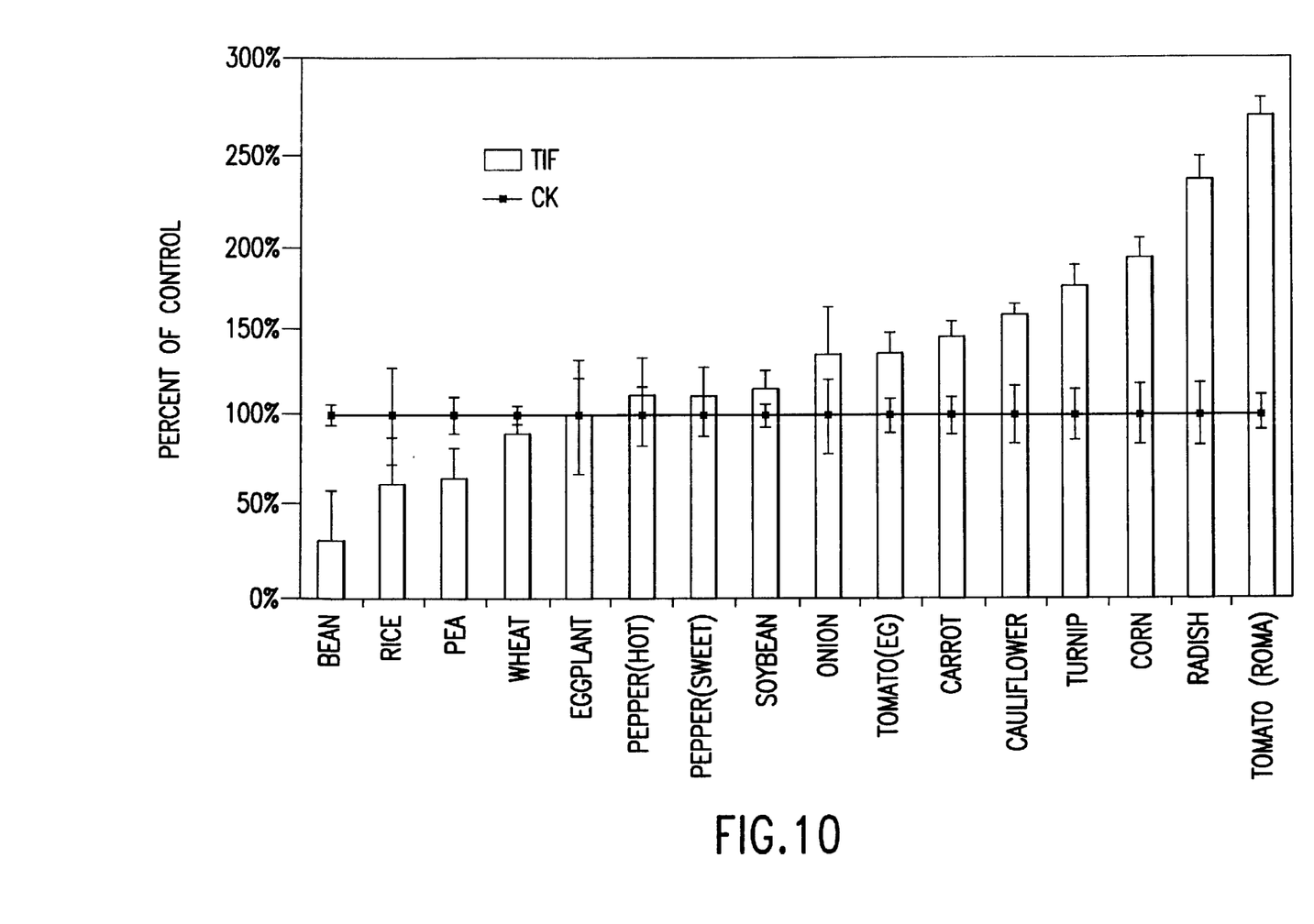
FIG. 10 shows the effect of the growth regulator of the present invention on root growth of several crop species.

Seedling studies have indicated that the activity is variable, depending upon the species being evaluated. The effects of TIF on root elongation of a number of different species are shown in FIG. 10. Classification of the species response is provided in Table 3. This suggests that biological activity is present in the solution, and that the response is species specific. However, the results strongly suggest that bioactivity of the solution produced through recirculating NFT is not specific to potatoes.

The factor in the solution is stable when potatoes are removed from the solution. This is indicated in long duration studies (FIG. 3), and the controlled environment and seedling bioassay studies which utilized solutions which had been stored for periods ranging from 14 days to 125 days without an apparent loss of activity. Tuber bioassays have indicated that biological activity is retained for at least 11 months storage at 4° C.

The foregoing examples were presented for the purpose of illustration and description only and are not to be construed as limiting the invention in any way. The scope of the invention is to be determined from the claims appended hereto.

What is claimed is:

1. A process for the production of a vegetative and tuber growth regulator comprising the steps of:

placing potato plants in a hydroponic system provided with a means for recirculating nutrient solution, recirculating a nutrient solution through the hydroponic system, adding a makeup solution to the recirculating nutrient solution at predetermined intervals, said makeup solution being of a composition which ensures that the nutrient content of the nutrient solution is restored to a predetermined level, contacting the roots of the potato plants with the recirculating nutrient solution for a sufficient time period for the plants to produce a vegetative and tuber growth regulator, and separating the vegetative and tuber growth regulator from the hydroponic system.

2. A process as claimed in claim 1 comprising the additional step of adding acid to the nutrient solution to maintain the pH of the nutrient solution at a substantially constant value of from about pH 5.5 to about pH 6.0.

3. A process as claimed in claim 2 wherein the composition of the makeup solution is tailored to maintain the electrical conductivity of the nutrient solution at about 1.2 $\mu$S/cm.

4. A process as claimed in claim 3 wherein the nutrient solution is a half strength modified Hoagland solution.

5. A process as claimed in claim 3 wherein the makeup solution is a potato bioreactor effluent obtained by aerobically digesting biomass from potato plants using microorganisms.

6. A process as claimed in claim 5 wherein the air surrounding the hydroponic system is maintained at a temperature of from about 18 to about 26° C. and the nutrient solution is maintained at a temperature of from about 15 to about 25° C.

7. A vegetative and tuber growth regulator made by the process of claim 5.

8. A vegetative and tuber growth regulator made by the process of claim 3.

9. A process as claimed in claim 1 wherein the potato plants are grown using a photoperiod of from about 4 to about 20 hours per 24 hour period.

10. A vegetative and tuber growth regulator made by the process of claim 1.

11. A method for regulating plant growth in solanaceous plants, tuber forming plants and ornamental seedlings comprising the step of contacting the roots of a plant selected from the group consisting of solanaceous plants, tuber forming plants and ornamental seedlings with a sufficient amount of a vegetative and tuber growth regulator made by the process of claim 1 to regulate the growth of the plant.

12. A method as claimed in claim 11 wherein the root of the plant is contacted with the vegetative and tuber growth regulator for a period of not less than twenty-five days.

13. A method as claimed in claim 12 wherein the plant growth regulator is incorporated in a nutrient solution used to provide nourishment to the plant.

\* \* \* \* \*